R. E. BOWERS.
STEERING WHEEL FOR AUTOMOBILES.
APPLICATION FILED OCT. 30, 1909.
959,298.
Patented May 24, 1910.
2 SHEETS—SHEET 1.
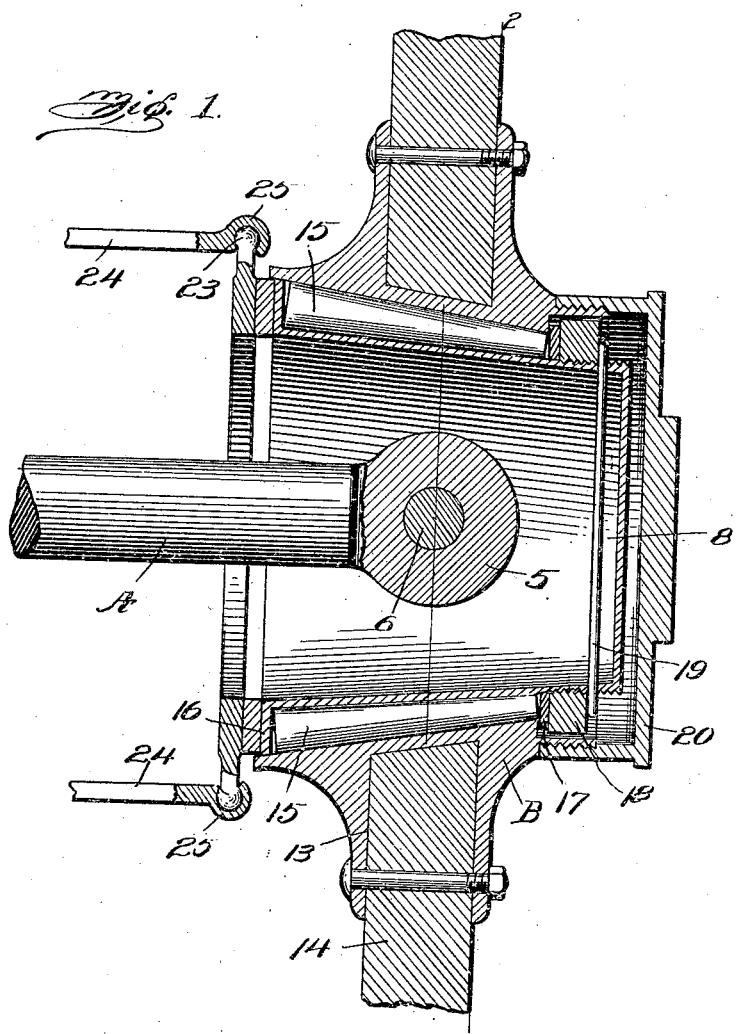
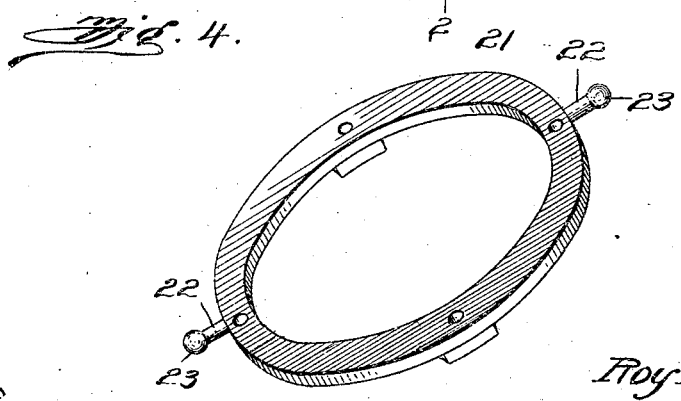
Inventor
Roy E. Bowers.
Witnesses
By Victor J. Evans
Attorney R. E. BOWERS.
STEERING WHEEL FOR AUTOMOBILES.
APPLICATION FILED OCT. 30, 1909.
959,298.
Patented May 24, 1910.
2 SHEETS—SHEET 2.
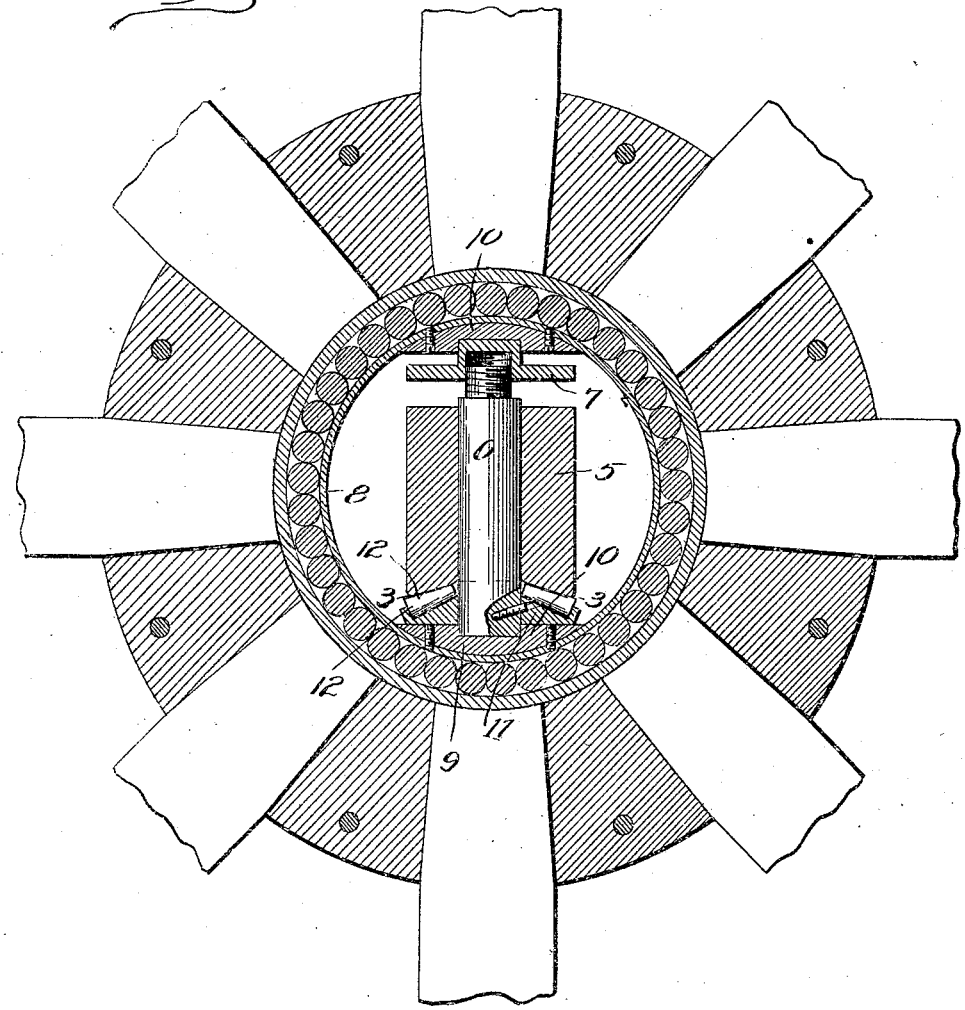
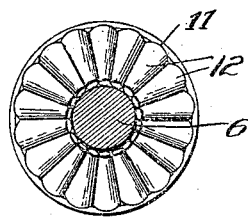

UNITED STATES PATENT OFFICE.

ROY E. BOWERS, OF HARTVILLE, OHIO, ASSIGNOR TO JOHN A. BOWERS, OF PAYETTE, IDAHO.

STEERING-WHEEL FOR AUTOMOBILES.

959,298.  Specification of Letters Patent.  Patented May 24, 1910.

Application filed October 30, 1909. Serial No. 525,438.

*To all whom it may concern:*

Be it known that I, ROY E. BOWERS, a citizen of the United States, residing at Hartville, in the county of Stark and State of Ohio, have invented new and useful Improvements in Steering - Wheels for Automobiles, of which the following is a specification.

This invention relates to automobiles and motor vehicles, and it has particular reference to steering mechanism for that class of motor vehicles which are equipped with a stationary front axle upon which the wheels are supported for rotation in such a manner that they may be moved about an approximately vertical axis for steering purposes.

The object of the invention is to simplify and improve the wheel construction and the connecting means whereby the wheels are supported upon the axle, and with these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

In the drawings,—Figure 1 is a vertical sectional view taken through one end of the front axle and through a portion of the wheel. Fig. 2 is a transverse sectional view taken on the plane indicated by the line 2—2 in Fig. 1. Fig. 3 is a horizontal sectional view taken on the plane indicated by the line 3—3 in Fig. 2. Fig. 4 is a perspective detail view of the ring constituting the steering arm.

Corresponding parts in the several figures are denoted by like characters of reference.

The front axle A is provided with a terminal eye 5 for the passage of a bolt 6 extending vertically therethrough and provided at its upper end with a cap nut 7. The steering knuckle consists of a cup-shaped casing 8 of tapering shape which is provided with interiorly disposed bearings 9 and 10 for the lower end of the bolt 6 and for the cap nut 7, as will be clearly seen in Fig. 2 of the drawings. The lower bearing 9 supports a race 11 between which and the underside of the axle eye 5 anti-friction rollers of conical shape are interposed. It will be seen that the parts may be disassembled by turning the nut 7 downward upon the bolt so as to disengage the cap of said nut from its bearing, while by turning or screwing said nut in an upward direction, the parts may be assembled for pivotal movement.

The hub B of the wheel is provided with mortises or sockets 13 for the reception of the inner ends of the spokes 14. The hub surrounds the knuckle 8, conical anti-friction rollers 15 being interposed between the two, and the inner ends of the rollers abutting upon a flange 16 of the knuckle. The latter is externally threaded at its outer end for the reception of a washer 17 and a nut 18, whereby the space between the knuckle and the hub is closed and guarded, for the purpose of securing the nut against rotation. Any suitable means, such as a pin or cotter 19, may be used. A cap 20 is threaded externally upon the outer end of the hub.

Suitably secured upon the flange 16 of the knuckle is a steering arm which in this instance consists of a ring 21 provided with diametrically opposite laterally extending arms 22 having terminal ball-shaped heads 23 for connection with the steering rod or rods 24, two of which have been shown in Fig 1, located respectively in front and in rear of the axle, but either one of which may be dispensed with, if desired. Said rods have been shown as provided with terminal sockets 25 engaging the balls 23, but it is obvious that joints of any suitable and appropriate construction may be used. The steering rods are to be connected with steering mechanism of any suitable and approved construction, which does not, however, form a part of the present invention.

From the foregoing description, taken in connection with the drawings hereto annexed, the operation and advantages of the invention will be readily understood by those skilled in the art to which it appertains. The construction is extremely simple and inexpensive and of such a nature that the parts may be very readily disassembled for repairs and again put together when desired. The knuckles are free to move pivotally in an approximately horizontal plane upon the ends of the axle, while the wheels are free to rotate upon the knuckles in an approximately vertical plane.

Having thus described the invention, what is claimed as new, is:—

1. An axle having a terminal eye, a bolt extending vertically therethrough and having a cap nut, and a steering knuckle consisting of a casing having bearings for the lower end of the bolt and for the cap nut at the upper end of said bolt.

2. An axle having a terminal eye, a bolt extending vertically therethrough and having a vertically adjustable cap nut at one end, a knuckle casing having interiorly disposed bearings for one end of the bolt and for the nut at the opposite end of the bolt, a race supported upon the lower bearing, and anti-friction members interposed between said bearing and the axle.

In testimony whereof I affix my signature in presence of two witnesses.

ROY E. BOWERS.

Witnesses:
  C. W. BAIR,
  ADAM GINTHER.